US009316489B2

(12) United States Patent
Hofmeister et al.

(10) Patent No.: US 9,316,489 B2
(45) Date of Patent: Apr. 19, 2016

(54) LASER FRAME TRACER

(71) Applicant: Pro Fit Optix Inc., Irving, TX (US)

(72) Inventors: William Todd Hofmeister, Flower Mound, TX (US); Hoa D Nguyen, Cedar Hill, TX (US)

(73) Assignee: Pro Fit Optix Inc., Irving, TX (US)

( * ) Notice: Subject to any disclaimer, the term of this patent is extended or adjusted under 35 U.S.C. 154(b) by 111 days.

(21) Appl. No.: 14/018,311

(22) Filed: Sep. 4, 2013

(65) Prior Publication Data

US 2014/0240460 A1 Aug. 28, 2014

Related U.S. Application Data

(63) Continuation of application No. 13/683,484, filed on Nov. 21, 2012, now abandoned.

(51) Int. Cl.
| | |
|---|---|
| *G01N 21/00* | (2006.01) |
| *G01B 11/24* | (2006.01) |
| *G01B 11/02* | (2006.01) |
| *G01B 5/00* | (2006.01) |

(52) U.S. Cl.
CPC ............ *G01B 11/24* (2013.01); *G01B 5/0004* (2013.01); *G01B 11/022* (2013.01)

(58) Field of Classification Search
CPC ...... B24B 9/144; B24B 13/0055; B24B 9/14; B24B 9/148; B24B 47/225; B24B 49/04; B24B 9/146; G02C 13/003; G02C 9/04; G02C 13/001; G02C 13/005; G01B 5/20; G01B 21/04; G01B 7/28
See application file for complete search history.

(56) References Cited

U.S. PATENT DOCUMENTS

| | | | | |
|---|---|---|---|---|
| 5,138,770 A | * | 8/1992 | Matsuyama | 33/28 |
| 5,428,448 A | | 6/1995 | Albert-Garcia | |
| 6,033,138 A | * | 3/2000 | Kerr | 400/328 |
| 6,263,583 B1 | * | 7/2001 | Mizuno | 33/28 |
| 6,618,952 B2 | | 9/2003 | Andrews et al. | |
| 6,637,737 B1 | | 10/2003 | Beecherl et al. | |

(Continued)

FOREIGN PATENT DOCUMENTS

| | | |
|---|---|---|
| DE | 4019866 A1 | 1/1992 |
| WO | 2008093332 A2 | 8/2008 |
| WO | 2011107529 A1 | 9/2011 |

OTHER PUBLICATIONS

Civicioglu et al., "A 3D Scanner Design Based on Line-Laser Stripping", published in Signal Processing and Communications Applications (SIU), 2011 IEEE 19th Conference, Apr. 20-22, 2011, pp. 972-975. Abstract only.

*Primary Examiner* — Michael P Stafira
(74) *Attorney, Agent, or Firm* — Warren Rhoades LLP

(57) ABSTRACT

A laser frame tracer (12) including a laser measuring unit (20) with a laser (36) and one or more cameras (38, 40) for optically measuring dimensions of eyeglass frames (10). A frame carrier (22) is provided for moving the eyeglass frames (10) through a laser line emitted by the laser (36). The frame carrier (22) includes a linear carriage (44) and a rotary carriage (88). Movement of the linear carriage (44) and the rotary carriage (88) are controlled by an on-board computer (116) which collects image data from the one or more cameras (38, 40). Image data is processed to determine a 3D model from which selected dimensions for the eyeglass frames (10) may be measured. The dimensions may be stored in a cloud database for access by others in cutting lenses to fit the eyeglass frames (10).

9 Claims, 5 Drawing Sheets

(56) References Cited

U.S. PATENT DOCUMENTS

| | | |
|---|---|---|
| 6,830,333 B2 | 12/2004 | Feldman et al. |
| 7,563,153 B2 | 7/2009 | Haddadi |
| 7,681,321 B2 | 3/2010 | Shibata |
| 7,925,371 B2 | 4/2011 | Takeichi |
| 8,015,716 B2 | 9/2011 | Matsuyama |
| 8,220,922 B2 | 7/2012 | Chauveau et al. |
| 2006/0281392 A1* | 12/2006 | Kim et al. ............ 451/8 |
| 2006/0286902 A1 | 12/2006 | Covarrubias et al. |
| 2008/0306709 A1* | 12/2008 | Fisker et al. ............ 702/167 |
| 2009/0201463 A1 | 8/2009 | Carlson |

\* cited by examiner

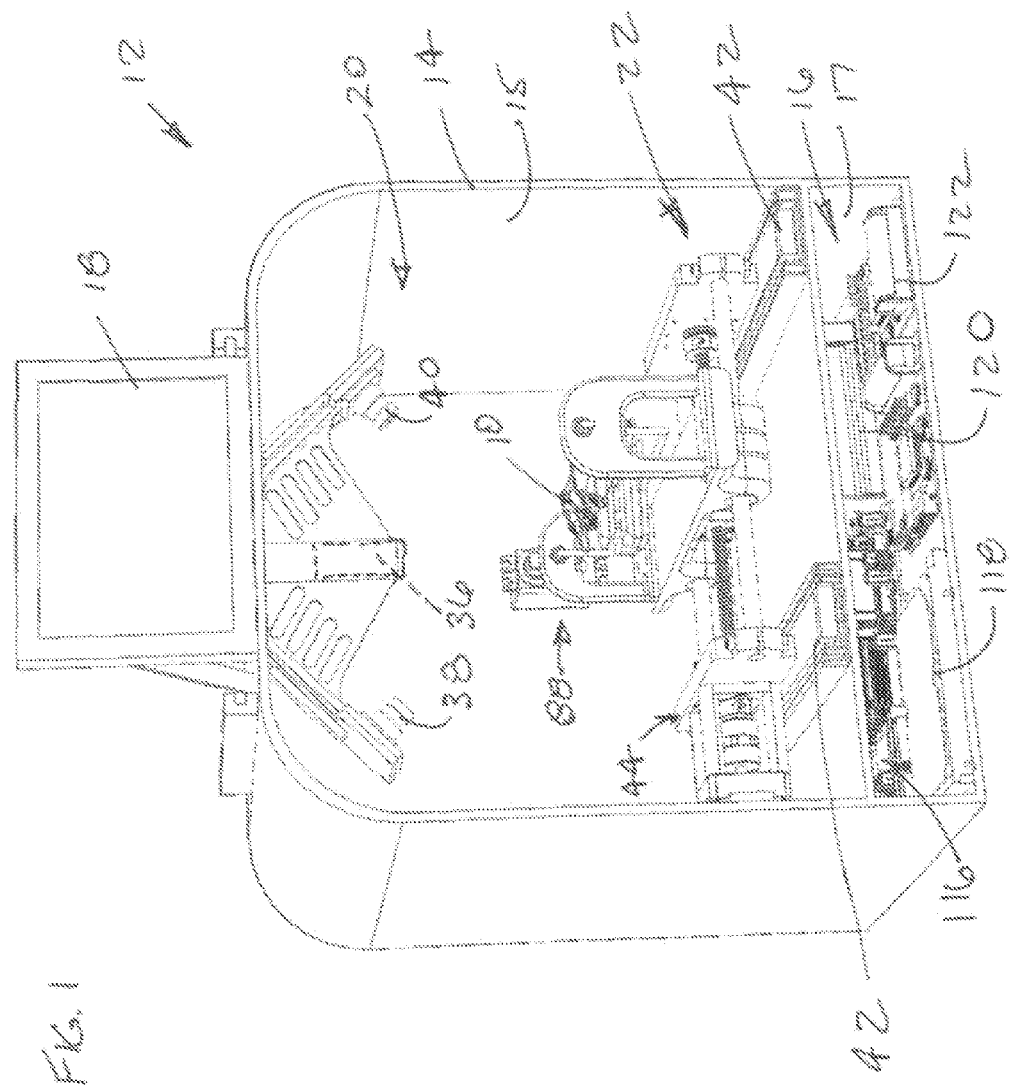

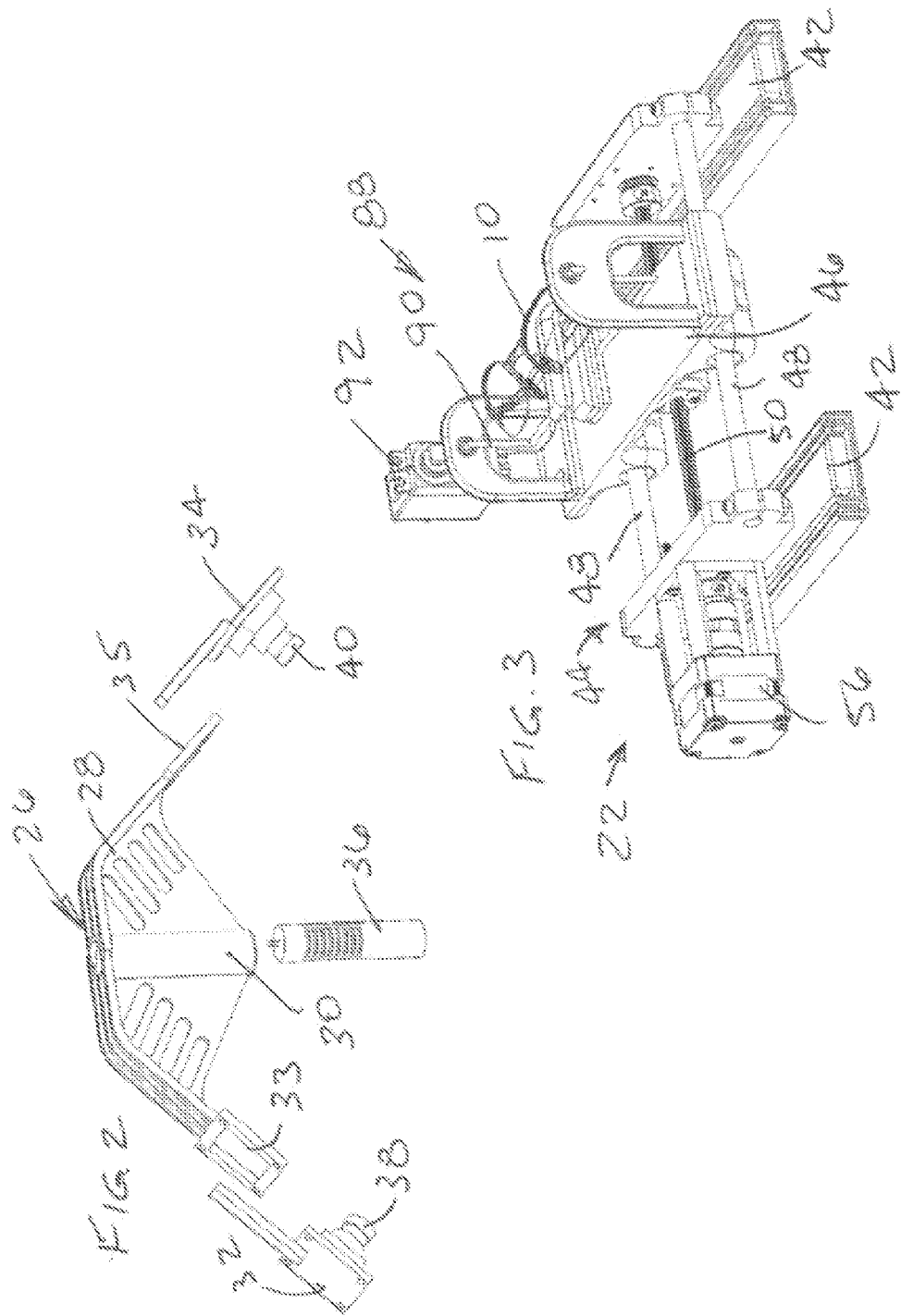

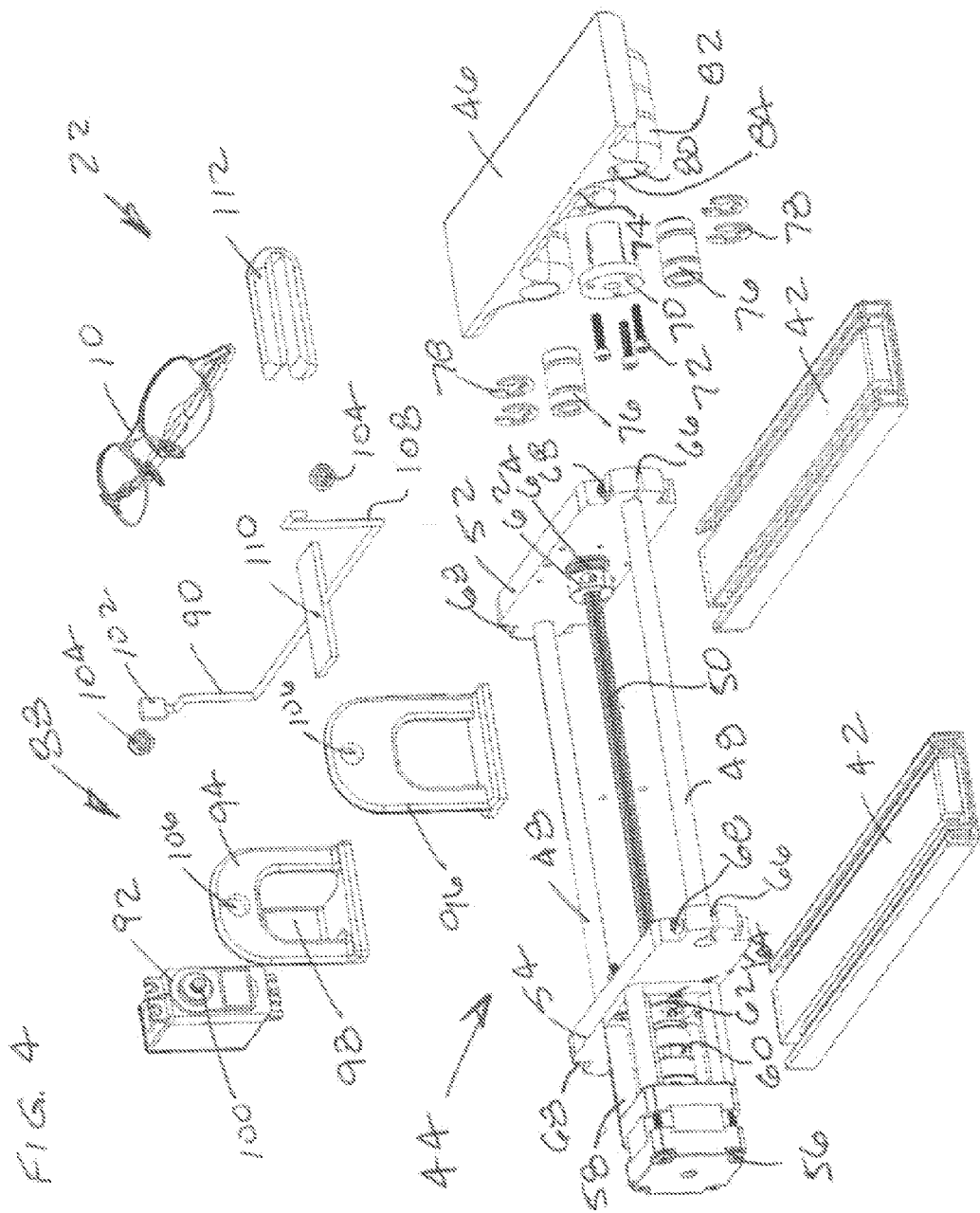

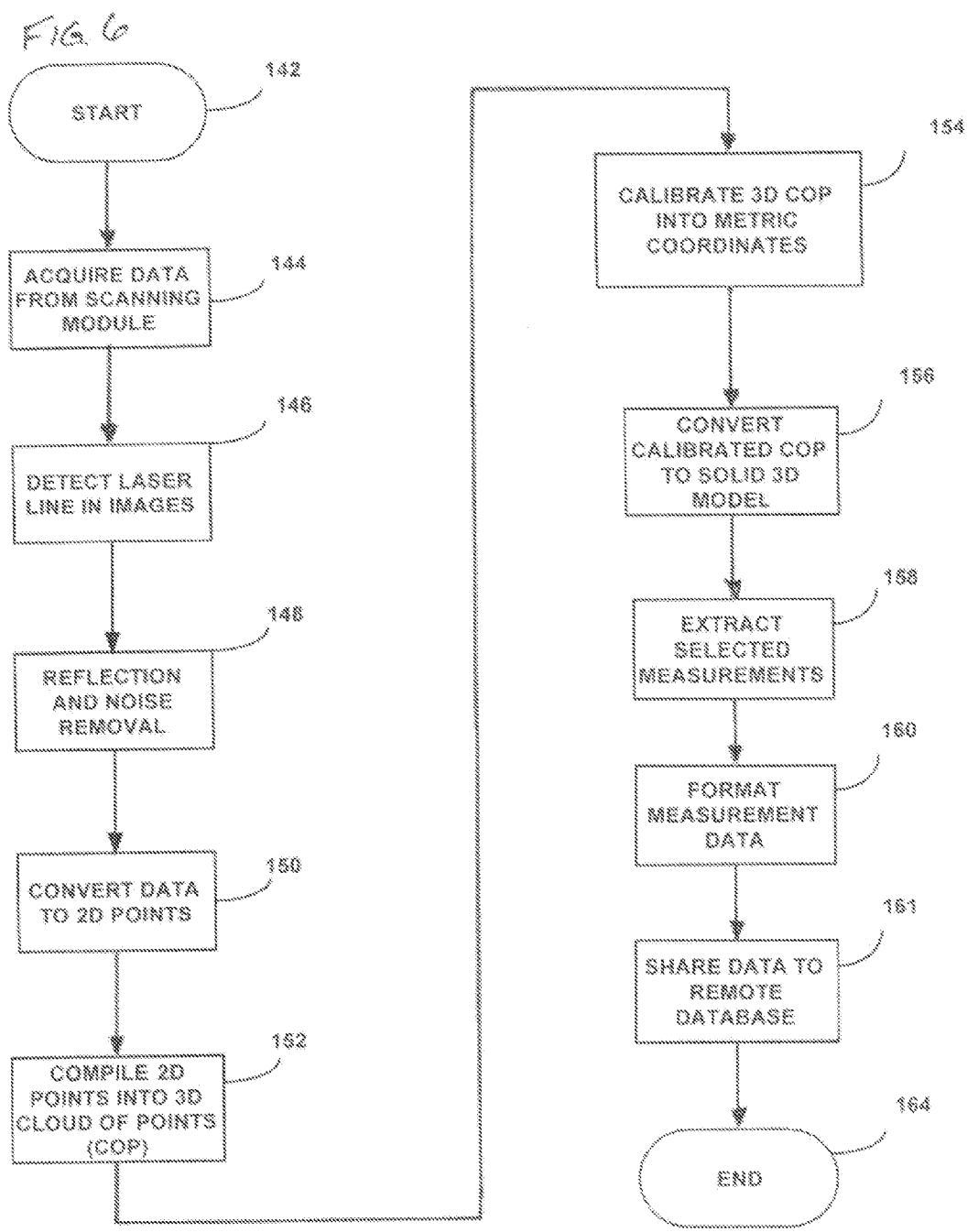

LASER FRAME TRACER

CROSS REFERENCE TO RELATED APPLICATIONS

The present application claims priority as a continuation application of U.S. patent application Ser. No. 13/683,484, filed on 21 Nov. 2012, and entitled "LASER FRAME TRACER."

FIELD

The present disclosure relates in general to automated measurement units, and in particular to units for optically measuring eyeglass frames.

BACKGROUND

Prior art eyeglass frame measurement units have been provided for measuring eyeglass frames to determine the dimensions for cutting lenses for fitting the frames. Prior art units have included units with mechanical measurement probes which make contact with and push against the eyeglass frames to trace the frames and thereby determine dimensions of the frames. The measured dimensions are then stored for later use to cut the lenses to size. Problems often arises with measurement probes running across surfaces of the frames, and debris can also interfere with obtaining accurate measurements.

SUMMARY

A laser frame tracer is provided for optically measuring dimensions for eyeglass frames. The laser frame tracer includes an enclosure with an on-board computer which interfaces with a touch screen monitor for operator input. A laser measuring unit has a laser which emits laser light along a line and cameras which are mounted for receiving light emitted by the laser and reflected off the frame. A frame carrier is provided for mounting eyeglass frames and moving the eyeglass frames through the laser line emitted from the laser. The frame carrier includes a linear carriage and a rotary carriage mounted to the linear carriage. Movement of the linear carriage and the rotary carriage are controlled by the onboard computer which collects image data from the cameras. The image data is processed to determine a solid 3D model for the frames from which selected dimensions for the eyeglass frame may be digitally measured. The dimensions may be stored in a cloud database for access by others in cutting lenses to fit other eyeglass frames of the same model.

BRIEF DESCRIPTION OF THE DRAWINGS

For a more complete understanding of the embodiments of the laser frame tracer disclosed herein and the advantages thereof, reference is now made to the following description taken in conjunction with the accompanying Drawings in which FIGS. 1 through 6 show various aspects for a laser frame tracer, as set forth below:

FIG. 1 is a perspective view of the laser frame tracer;

FIG. 2 is a partially exploded view of a laser measuring unit of the laser frame tracer;

FIG. 3 is a perspective view of a frame carrier shuttle of the laser frame tracer;

FIG. 4 is an exploded view of the frame carrier shuttle of the laser frame tracer;

FIG. 5 is a flow chart illustrating operation of the laser frame tracer for collecting image data for a frame; and FIG. 6 is a flow chart illustrating operation of the laser frame tracer for processing the image data to provide selected frame measurements.

DETAILED DESCRIPTION

Figure 5:
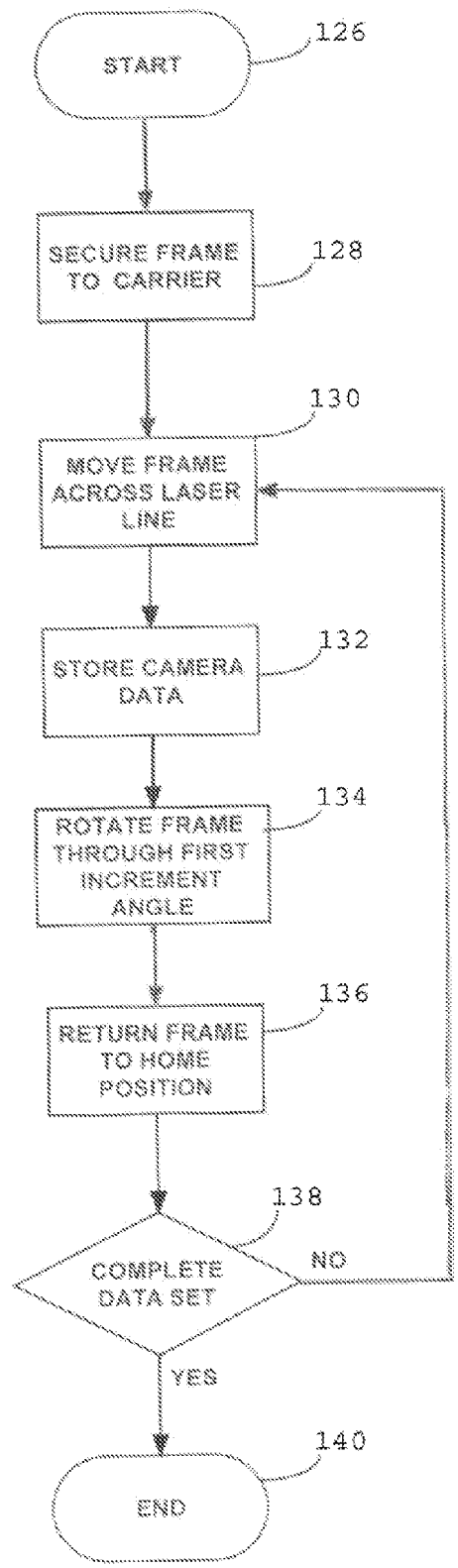

Detailed embodiments of laser frame tracers are disclosed herein, however, it is to be understood that the disclosed embodiments are merely exemplary of the laser frame tracers, which may be embodied in various forms. Therefore, specific functional details disclosed herein are not to be interpreted as limiting, but merely as a basis for the claims and as a representative basis for teaching one skilled in the art to variously employ the present disclosure.

FIG. 1 is a perspective view of the laser frame tracer 12 for measuring the geometry of an eye wear frame 10 for cutting lenses to fit the frame 10. The laser frame tracer 12 includes an enclosure 14 with a first compartment 15 and a second compartment 17. The first compartment 15 houses a laser measuring unit 20 and a frame carrier shuttle 22. The laser measuring unit 20 is located in a fixed position within the housing 14 and the frame carrier shuttle 22 moves the frames beneath the laser measuring unit 20. The laser measuring unit 20 has a laser 36 which emits laser light, for example, in a line, and one or more cameras, for example, cameras 38 and 40, which measure the reflection of the laser light off the frame 10. The frame carrier shuttle 22 includes a linear carriage 44 and a rotary carriage 88 which is mounted to the linear carriage 44. The frames 10 are mounted to the rotary carriage 88. The linear carriage 44 moves the frames 10 beneath the laser 36, and the rotary carriage 88 moves the frames 10 to a different angular position between each pass through the laser 36. The frame carrier shuttle 22 sequentially moves the frames 10 beneath the laser 36 and the cameras 38 and 40 with the rotary carriage 88 indexing the frames 10 into different angular positions, such that a complete geometry of the peripheral surfaces of the frames 10 may be determined by recording the light from the laser reflected from the frames 10.

The second compartment 17 houses onboard electronics 16 which include an onboard computer 116, a hard drive 118, a power supply 120 and interface boards 122. The interfaces boards 122 contain circuitry and drivers for operating the laser measuring unit 20 and the frame carrier 22. The onboard computer 116 and the hard drive 118 together define a data processing unit. The onboard computer 116 has a data processor and memory, and may be connected to a computer or computer network, for example, a global computer network for sharing information. The data processor in the onboard computer 116 emits control signals which control operation of the laser frame tracer 12 and processes recorded images to determine a 3D model for a frame 10 from which selected measurements for the frame 10 may be calculated. A touch screen monitor 18 is provided for data display and user input into the onboard computer 116 for controlling operation of the laser frame tracer 12. A data link is provided between the cameras 38 and 40 and the onboard computer 116 for storing images from the cameras 38 and 40. The cameras 38 and 40 may be directly connected to the motherboard of the computer 116, or in some embodiments connected through the interface boards 122. The interface boards 122 can apply electric power for operating a motor 56, for example, a stepper motor, for the linear carriage 44 and a motor 93, for example, a servo motor, for the rotary carriage 88 in response to control signals from the computer 116.

FIG. 2 is a partially exploded view of the laser measuring unit 20. The laser measuring unit 20 includes a mount 26 which is secured in fixed position relative to the enclosure 14. The mount 26 has a frame 28 which includes a centrally disposed laser mounting bracket 30 and camera mounts 33 and 35, which are located on opposite sides of the laser mounting bracket 30. The laser 36 is mounted to the laser mounting bracket 30. The laser 36 emits laser light, for example, along a line. Mounting brackets 32 and 34 are provided for releasably securing to respective ones of the camera mounts 33 and 35 for securing the cameras 38 and 40, respectively, in fixed position relative to the frame 28, on opposite sides of the laser 36.

FIG. 3 is a perspective view of the frame carrier shuttle 22. The shuttle 22 is mounted to the housing 14 by two slides 42, allowing the frame carrier shuttle 22 to easily be removed from the housing 14 to provide access to a user for installation and removal of the frames 10 from the shuttle 22. The frame carrier shuttle 22 includes the linear carriage 44 and the rotary carriage 88, with the rotary carriage 88 mounted atop the linear carriage 44. The linear carriage 44 has a platform 46 which is slidably mounted to two rods 48. The platform 46 is threadingly secured to a lead screw 50 such that rotation of the lead screw 50 in opposite angular directions will linearly move the platform 46 in respective ones of two different linear directions, parallel to the two rods 48. The two rods 48 extend with axes which are generally horizontal, such that the platform 46 slides in horizontal directions. A drive motor 56 is preferably provided, for example, as a stepper motor and is coupled to the lead screw 50 for rotating the lead screw 50 in selected angular directions. The onboard computer 116 provides a data processing unit which emits linear position control signals for operating the drive motor 56 and turning the lead screw 50 to move the platform 46 beneath the measuring unit 20 and to selected positions. The rotary carriage 88 includes a carrier 90 which is connected to a motor 92, which is preferably provided, for example, as a servo motor. The eye glass frames 10 are mounted to the carrier 90, and rotated to selected angular positions by the motor 92.

FIG. 4 is a partially exploded view showing various components of the frame carrier shuttle 22 of the laser frame tracer 12. The platform 46 of the linear carriage 44 is slidably secured to two rods 48, and rotatably secured to a lead screw 50. The rods 48 are fixedly secured, that is secured in fixed positions, with two spaced apart carriage brackets 52 and 54. The carriage brackets 52 and 54 include through-holes with adjacent slots 66 for slidably receiving respective ends of the rods 48, and fasteners 68 are tightened across the slots 66 to fixedly secure the ends of the rods 48 within the holes and the adjacent slots 66. The lead screw 50 preferably includes threads, for example, acme threads, and is rotatably secured between the two carriage brackets 52 and 54 by means of collars 62 and bearings 64 in a conventional fashion. The lead screw 50 and the two rods 48 are spaced apart and extend in parallel to one another. A motor coupling 60 secures the lead screw 50 to the drive shaft of the motor 56. A motor mount bracket 58 secures the motor 56 to the carriage bracket 54, here, in a direction projecting outward with respect to from between the two carriage brackets 54 and 56.

The platform 46 has a through-hole 74 for receiving a drive nut 70, which is preferably secured in fixed position within the through-hole 74 by threaded fasteners 72. As illustrated, there are three threaded fasteners 72, however it should be appreciated that less than or more than three threaded fasteners may be used. The fasteners 72 secure the drive nut 70 in the through hole 74 in a fixed angular and linear position relative to the platform 46. The lead screw 50 is threadingly received within the drive nut 70 such that rotation of the lead screw 50 within the nut 70 will linearly move the platform 46 along the rods 48. Two bearings 76 are slidingly secured to the rods 48 with snap rings 78. The platform 46 has through openings 80 for receiving and securing respective ones of the bearings 76 therein. The openings 80 extend on an underside of the platform 46, defined by grooves 84 against which clam shells 82 are secured to fixedly secure the bearings 76 therebetween and within the openings 80.

The rotary carriage 88 includes two brackets 94 and 96 which are mounted atop the platform 46. The bracket 94 also includes a motor mount 98 to which the motor 92 is secured. The motor 92 may be, for example, a servo motor, and its angular position is controlled by angular position control signals from the computer 116 in the second compartment 17. A carrier 90 is provided as a rod 108 which is formed to have a U-shape. The carrier 90 includes an end 102 which is non-rotatably secured, or fixedly secured, to the drive shaft 100 of the motor 92. The end 102 and the opposite end of the carrier 90 are rotatably secured within the bearing mounting holes 106 of the brackets 94 and 96, respectively, by bearings 104. A mounting boss 110 is fixedly secured to the rod and provides a platform to which a clamp 112 is fixedly secured. As illustrated, the clamp 112 is U-shaped and secures the eyewear frame 10 to the carrier 90. However, it should be appreciated that other securing mechanisms may be used instead of or in addition to the clamp 112 to secure the eyewear frame 10 to the carrier 90. The motor 92 will rotate the carrier 90 to selected positions, to align the frame in different angular positions as it is moved by the linear carriage 44 for different passes beneath the laser measuring unit 20.

In operation the eyeglass frame 10 is placed in the clamp 112. The frame 10 is then shuttled beneath the laser 36 and through the emitted laser light by means of the linear carriage 44 making multiple passes moving in linear directions through the laser light, and the rotary carriage 88 moving in angular directions to index the frame 10 into different angular positions between the different passes through the laser light. The laser light is reflected from the frame 10 during the multiple passes and images of the frame 10 passing through the laser light at different angles are recorded by the cameras 38 and 40. The recorded images are processed by the onboard electronics 16 to determine a 3D model from which selected dimensions for the eyeglass frame 10 may be electronically measured. The traced dimensions may then be stored in a database which may also be accessed by others, for example, via a wired or wireless network, such as the Internet.

FIG. 5 is a flow chart illustrating operation of the laser frame tracer 12 for collecting image data for the frame 10 being traced. The process starts in step 126, and in step 128 the frame 10 is secured to the frame carrier 22 by means of the clamp 112. In step 130, the motor 56 is powered to move the frame 10 through the laser light, which may be a laser line, emitted by the laser 36, as the two cameras 38 and 40 digitally record images of the frame 10 passing through the laser line emitted by the laser 36. In step 132, data representing the digital images is stored, for example, in a database. In step 134, the motor 92 is powered to rotate the rotary carriage 88 and angularly move the frame 10 through an incremental angle for recording images of the frame 10 at a different angle from prior images. In step 136, the motor 56 moves the platform 46 back to a home position. In step 138, the process determines whether a complete data set of images has been collected for building a solid 3D model for the frame 10. If not, the process returns to step 130 to move the frame 10 across the laser line emitted by the laser 36, stores camera images in step 132, and proceeds through the steps 134 and 136. When in step 138 a determination is made that a complete set of images has been acquired to construct a 3D model of the frame 10, the process proceeds to the end step 140.

FIG. 6 is a flow chart illustrating operation of the laser frame tracer 12 for processing the image data to provide selected frame measurements. In one embodiment, the image data is processed in the onboard electronics 16, including the onboard computer 116, but in other embodiments the raw image data may be exported from the onboard computer 116 into a local or remote database for processing by a local or remote processing unit to determine a solid 3D model for the frame 10. Selected measurements, for example, a height, a width, and other dimensions of the portion of the frame 10 that holds a lens, may be electronically measured from the 3D model by a processing unit for cutting lenses to size for fitting the frame. The process starts in step 142, and in step 144 the raw image data is acquired from a scanning module, or from a database in which the data is stored. In step 146, the image data is processed to detect, for various image frames, the position of the laser line emitted by the laser 36. Reflection and noise filters may then be applied in step 148. In step 150, detected data points from selected data frames are converted into 2D data points. In step 152, the 2D data points are compiled into a 3D cloud of data points ("COP"). In step 154, the 3D COP is calibrated into metric coordinates, which are then converted in step 156 into a 3D model for the frame 10 being traced. In step 158, selected measurements are extracted from the solid 3D model. In step 160, the measurements are formatted, for example, for sharing, and in step 161, the selected measurements are loaded into a remote database. The measurements stored in the remote database may be used for cutting lenses locally, for example, by a lens manufacturer, or sharing with others at remote locations for use in cutting lenses. Additionally, the entire 3D model may be loaded into the remote database for sharing with others.

The disclosure provides a laser frame tracer 12 having a rotary carriage 90 mounted atop a linear carriage 44. An eyeglass frames 10 is mounted atop the rotary carriage 88. The onboard electronics 16 control movement of the rotary carriage 88 and the linear carriage 44 to pass the eyeglass frame 10 through the laser line emitted by the laser 36 and beneath the cameras 38 and 40. Light reflected off the frame 10 is recorded as digital images by the cameras 38 and 40, and the digital images are processed to detect the position of the laser line on the frame 10 in the digital images. Based on the detected positions of the laser line a 3D model of the frame 10 is constructed. Measurements may then be digitally taken from the 3D model of the eyeglass frame 10.

Although certain embodiments have been described in detail, it should be understood that various changes, substitutions and alterations can be made therein without departing from the spirit and scope of the disclosure. The present disclosure is thus not to be limited to the precise details of methodology or construction set forth above as such variations and modification are intended to be included within the scope of the present disclosure.

Although the laser frame tracer 12 is described as having the laser measuring unit 20, including the laser 36 and cameras 38 and 40, located in a fixed position and a frame carrier shuttle 22 that moves the frame 10 beneath the laser measuring unit 20, the frame 10 may disposed in a fixed position and the laser measuring unit 20 may move above and around the frame 10. Although the laser 36 is described as emitting laser light in a line, such as provided by a line laser, other types of lasers may be used, for example, including a point laser. Further, although the laser frame tracer 12 is described as measuring one frame 10 at a time, the laser frame tracer 12 may be adapted to measure more than one frame 10 at the same time, for example, in parallel or in series.

Further, as used in the disclosure, the term "a" or "one" may include one or more items unless specifically stated otherwise. The phrase "based on" is intended to mean "based at least in part on" unless specifically stated otherwise. Moreover, unless specifically stated any use of the terms first, second, etc. do not denote any order or importance, but rather the terms first, second, etc. are merely used to distinguish one element from another.

What is claimed is:

1. A laser frame tracer, comprising:
   a data processing unit providing control signals and rotary control signals;
   a laser measuring unit including a laser selectively emitting a laser line and at least one camera, said at least one camera recording images of said laser line reflected from an eyeglass frame passed through said laser line;
   a linear carriage including;
   a platform;
   two carriage brackets;
   two rods and a lead screw which extend in parallel between said two carriage brackets;
   a drive nut fixedly secured to said platform, said drive nut shaped to rotatably receive said lead screw, said platform further including bearings slidably receiving respective ones of said two rods;
   a motor mount;
   a linear drive motor having a drive shaft; and
   a motor coupling shaped to secure said drive shaft of said linear drive motor to said lead screw, wherein said control signals from said data processing system apply power signals to operate said linear drive motor and turn said lead screw;
   a rotary carriage including a carrier pivotally mounted to said platform and a rotary motor connected to said carrier, said rotary control signals applying power signals to operate said rotary motor and rotate said carrier to one or more selected angular positions with respect to said laser measuring unit;
   a clamp mounted to said carrier and shaped to removably secure the eyeglass frame to said carrier for moving therewith through said laser line; and
   a data link electrically connecting said at least one camera and said data processing unit and communicating said images recorded by said at least one camera to said data processing unit, said data processing unit storing said recorded images communicated from said at least one camera.

2. The laser frame tracer according to claim 1, wherein said rotary carriage further comprises;
   first and second brackets mounted to said platform spaced apart and adapted to pivotally securing said carrier therebetween; and
   a motor bracket secured to said first bracket and to which said rotary motor is secured.

3. The laser frame tracer according to claim 1, wherein said data processing unit constructs a 3D model from said stored images and determines selected measurements representing dimensions for the eyeglass frame based on said 3D model.

4. The laser frame tracer according to claim 1, further comprising an enclosure housing said laser measuring unit, said linear carriage, and said rotary carriage, said laser measuring unit further comprising a mounting frame mounted in a fixed position relative to said enclosure housing, said mounting frame including a laser mounting bracket shaped to secure said laser and at least one camera mounting bracket shaped to secure said at least one camera in spaced apart relation to focus said laser and said at least one camera on a selected lineal location.

5. The laser frame tracer according to claim 1, wherein said linear drive motor is a stepper motor and said rotary motor is a servo motor.

6. A laser frame tracer, comprising:
   a data processing unit providing control signals and rotary control signals;
   a laser measuring unit including a laser selectively emitting a laser line and at least one camera recording images of said laser line reflected from an eyeglass frame passed through said laser line;
   a frame carrier including a linear carriage and a rotary carriage which together move the eyeglass frame through said laser line;
   said linear carriage including;
   two carriage brackets;
   two rods and a lead screw which extend in parallel between said two carriage brackets;
   a platform including bearings slidably receiving respective ones of said two rods;
   a drive nut fixedly secured to said platform, said drive nut rotatably receiving said lead screw;
   a motor mount;
   a linear drive motor having a drive shaft; and
   a motor coupling a securing said drive shaft to said lead screw, said control signals from said data processing system applying power signals to operate said linear drive motor and turn said lead screw;
   said rotary carriage including;
   a carrier having ends;
   first and second brackets mounted to said platform said first and second brackets being spaced apart and pivotally securing said carrier there-between;
   a motor bracket and a rotary motor secured to said first bracket, said rotary motor having a rotary drive shaft connected to one end of said carrier, said rotary control signals from said data processing system applying power signals to operate said rotary motor and rotate said carrier to one or more selected angular positions;
   a clamp mounted to said carrier and shaped to removably to secure the eyeglass frame to said carrier for movement therewith; and
   a data link electrically connecting said at least one camera and said data processing unit and communicating said images recorded by said at least one camera to said data processing unit, said data processing unit storing said recorded images communicated from said at least one camera, constructing a 3D model from said images, and taking selected measurements representing dimensions for the eyeglass frame based on said 3D model.

7. The laser frame tracer according to claim 6, further comprising an enclosure housing said laser measuring unit, said linear carriage, and said rotary carriage, said laser measuring unit further comprising a mounting frame;
   mounted in a fixed position relative to said enclosure housing;
   including a laser mounting bracket shaped to secure said laser and at least one camera mounting bracket to secure said at least one camera in spaced apart relation to focus said laser and said at least one camera on a selected lineal location.

8. The laser frame tracer according to claim 7, wherein said linear drive motor is a stepper motor.

9. The laser frame tracer according to claim 8, wherein said rotary motor is a servo motor.

* * * * *